June 3, 1958     K. J. KOLLMANN     2,836,838

SAW CUTTING TOOL FOR PIPE CLEANERS AND THE LIKE

Filed April 21, 1952

INVENTOR.
KARL J. KOLLMANN
BY Charles L. Lovercheck
attorney

United States Patent Office 2,836,838
Patented June 3, 1958

2,836,838
SAW CUTTING TOOL FOR PIPE CLEANERS AND THE LIKE

Karl J. Kollmann, Erie, Pa.

Application April 21, 1952, Serial No. 283,473

4 Claims. (Cl. 15—104.09)

This invention relates generally to cutters and couplings therefor and more particularly to cutters and couplings for connecting cutters to the leading end of flexible shafts and rods forming part of a sewer cleaner.

It has heretofore been impossible to connect a cutter to the forward end of an open helical wound rod in such manner that the cutter would travel around a bend of one hundred eighty degrees in a water closet because of the length of the cutter. These connected rods must pass around traps and other bends in a sewer line while rotating at high speeds. It is necessary that the center of gravity of the cutter be disposed centrally of the cutter for the most efficient operation. Pin connections were previously used but because of the severe bends the rod had to traverse in passing around traps and the impacts against the sides of the pipes the cutters are subjected to, the pins have heretofore sheared or they are driven laterally outwardly, thereby leaving part of the connecting rods in the pipe line. To remove the parts of the rods from the pipe, it was necessary to dig through the earth to the sewer line and to remove the length of wire from the pipe at great labor and expense and ruination of the lawn and shrubbery. These prior cutters, besides being difficult to connect and disconnect, have been of such construction that the teeth would quickly wear and they would be of little value after a very short period of use. These prior cutters would not pass around a bend usually found in water closets and the like.

It is, accordingly, an object of my invention to overcome the above and other defects in cutters and couplings for a sewer cleaning machine and it is more particularly an object of my invention to provide a cutter and coupling means therefor for connecting the cutter to connecting rods so that it will pass through a sewer line.

Another object of my invention is to provide a cutter connection which is simple in construction, economical in cost, economical in manufacture, and efficient in operation.

Another object of my invention is to provide a novel cutter head and coupling which may be connected and disconnected in a minimum of time.

Another object of my invention is to provide a novel cutter head and coupling for connecting open helically wound rods thereto.

Another object of my invention is to provide a novel type cutter for use on pipe cleaners and the like.

Another object of the invention is to provide a cutter which will cut when progressing either forwardly or backwardly.

Another object of my invention is to provide a novel cutter head for connection to the end of a flexible shaft of a sewer cleaning machine whereby the connection is substantially centrally of the cutter head to permit the cutter head to pass around bends of minimum radius.

Another object of my invention is to provide a novel cutter head and coupling therefor for connection to connecting rods of a sewer cleaning machine which will not become uncoupled upon rotation thereof, which will pass around a bend of minimum radius, and which is efficient in cutting roots and like obstructions out of a sewer line while passing in either direction in the sewer line.

Other objects of my invention will become evident from the following detailed description, taken in conjunction with the accompanying drawings, in which Fig. 1 is a top view of the cutter according to my invention;

Figure 1:
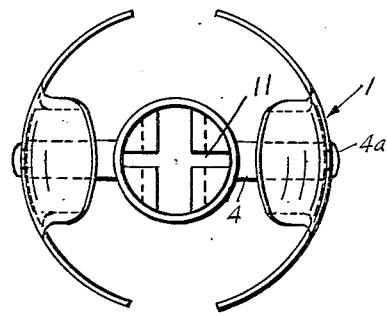
Figure 4:
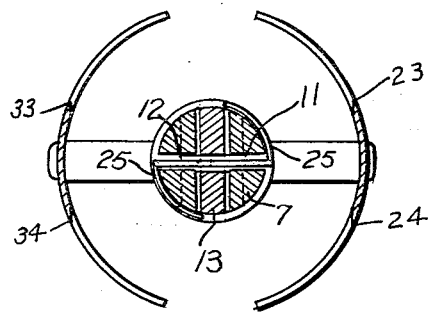
Fig. 4 is a section of the cutter taken on line 4—4 of Fig. 2.
Figure 2:
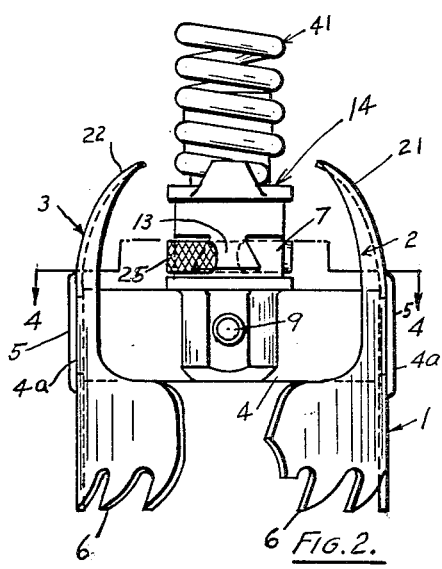
Fig. 2 is a side elevation of the cutter according to my invention showing the novel means for attaching a shaft to the cutter.
Figure 3:
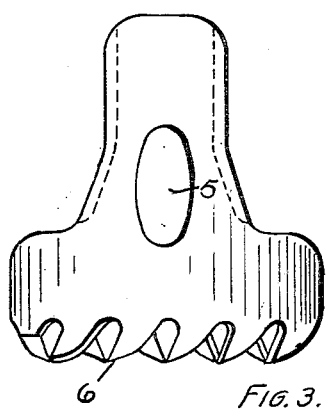
Fig. 3 is a side view of the cutter.
Figure 5:
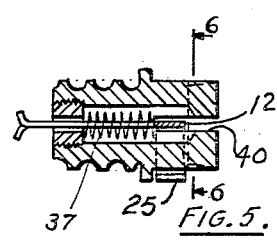
Fig. 5 is a cross sectional view taken on line 5—5 of Fig. 6.
Figure 6:
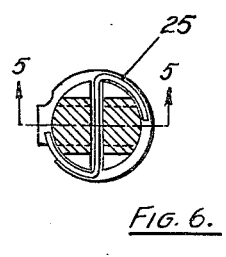
Fig. 6 is a view taken on line 6—6 of Fig. 5.

Referring now to the drawings, I show in Figs. 1 to 6 inclusive a cutter head 1 comprising members 2 and 3 connected together by a diametrically extending cross bar 4, the cutter members 2 and 3 being connected to the cross bar 4 by forming holes 4a in members 2 and 3, inserting the ends of bar 4 into the holes, and peening over the opposite ends forming projections 5 on the member 4. The cutter members 2 and 3 have teeth 6 on the forward end thereof of a suitable type for cutting into wood or other material lodged in a pipe line. A female coupling member 7 having a dove tailed cross slot 8 is connected to the cross bar 4 by a suitable pin, bolt, or rivet 9. The member 7 has a groove 11 as shown in Fig. 4 for receiving a locking member 12.

The dove tailed portion 8 of the member 7 is adapted to receive the dove tailed male end 13 of the coupling 14 which is the same as the coupling shown in my Patent No. 2,521,172. The dove tailed projection 13 has a transverse slot 40 formed therein for receiving a locking member 12 having finger engaging portions 25 extending clockwise so that the counterclockwise rotation of the coupling will not cause the finger engaging portions 25 to catch and open and unlock or uncouple the coupling members 14.

The members 2 and 3 have arcuate shaped cutting members 21 and 22 on the back side thereof with sharpened edges 23, 24, 33, and 34 so that the cutter head 1 will cut roots and other debris in passing through the pipe line in both a forward or a reverse direction.

In operation, the locking member 13 is drawn longitudinally through slot 8 by retracting the finger engaging portion 25 of the locking member 12 to a position adjacent the shoulder against the force of the coil spring 37. The dove tailed groove 8 in female connecting portion 7 is then disposed on the dove tailed projection 13 of the male member 14 and the locking member 12 is released whereby the spring moves it longitudinally to a locking position engaging the slots 11 in the female member 7.

From the above description, it will be seen that when the cutter 1 is mounted on a flexible shaft or sewer snake 41 and rotated in a counterclockwise direction when viewed from the teeth end of the cutter, the teeth 6 will cut roots and other debris. It will further be seen that if the cutter 1 is retracted or progressed in the opposite direction from the teeth 6, the cutting members 21 and 22 will cut roots and other debris inasmuch as they are sharpened on edges 23, 24, 33, and 34.

It will be evident from the foregoing description that I have provided a novel cutter and coupling member which will not become disconnected upon rotation thereof, which has the connection centrally of the cutter so that it will pass around a comparatively small trap or the like, which has cutter members to cut the debris when passing in either direction, which is adaptable for connection to any type of rod, and which is very simple in construction and easy to connect and disconnect.

Various changes may be made in the specific embodiment of my invention without departing from the spirit thereof or from the scope of the appended claims.

What I claim is:

1. A cutter head in combination with a sewer snake comprising a cross bar, a sewer snake, means to connect said sewer snake to said cross bar, cutter members rigidly connected to the ends of said cross bar, said cutter members extending forwardly of said cross bar and defining generally a cylinder having said cross bar disposed transversely thereof, the edges of said forwardly extending members remotest from said cross bar being disposed in and arcuate path having a plurality of spaced cutting teeth thereon, said teeth being disposed generally in a path defining an arc of a circle, and rearwardly extending cutting members supported on said cross bar and extending rearwardly from said cross bar adapted to guide said cutting member through a pipe and further adapted to cut debris from a pipe when said cutter is moved in a rearward direction, said rearwardly extending cutter members curving inwardly toward said snake.

2. A cutting head for connection to a sewer snake comprising a cutting member, means to connect said cutting member to said snake, said cutting member operationally extending forwardly from said snake and generally defining a cylinder, said cylindrically shaped member having spaced cutting teeth on the edge thereof remotest from said connecting means, said teeth being disposed in an arcuate path, and spaced wings connected to said cutting member extending rearwardly therefrom and curving inwardly toward the axis of said cylinder, said wings adapted to engage the inside of a pipe to guide said cutting member through the pipe and to cut debris from a pipe when debris comes into engagement therewith.

3. The cutting head recited in claim 2 wherein said means to connect said cutting member to said snake comprises a cross bar extending transversely of said cylinder and through the wall portions thereof, the ends of said cross bar being peened over the outer surface of said cylinder, thereby forming outwardly extending surfaces thereon whereby said cutting member is held out of engagement with the wall of a pipe.

4. The cutting head recited in claim 2 wherein said means for connecting said member to said snake is disposed adjacent the center of gravity of said head.

References Cited in the file of this patent

UNITED STATES PATENTS

| 53,203 | Waterman | Mar. 13, 1866 |
| 650,451 | Byers | May 29, 1900 |
| 1,042,841 | Thorsen | Oct. 29, 1912 |
| 1,077,784 | Atkinson | Nov. 4, 1913 |
| 1,132,691 | Sieben | Mar. 23, 1915 |
| 1,261,444 | Schied | Apr. 2, 1918 |
| 1,426,919 | Sladden | Aug. 22, 1922 |
| 1,641,312 | Bertone | Sept. 6, 1927 |
| 1,848,762 | Atkinson | Mar. 8, 1932 |
| 1,984,964 | Clark | Dec. 18, 1934 |
| 2,201,733 | Kollmann | May 21, 1940 |
| 2,292,713 | O'Leary | Aug. 11, 1942 |

FOREIGN PATENTS

| 453,177 | Great Britain | Sept. 7, 1936 |